US009708979B2

(12) United States Patent
Chasen

(10) Patent No.: US 9,708,979 B2
(45) Date of Patent: Jul. 18, 2017

(54) ENGINE INLET DUCT INSTALLATION

(71) Applicant: Sikorsky Aircraft Corporation, Stratford, CT (US)

(72) Inventor: Scott A. Chasen, Orange, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 798 days.

(21) Appl. No.: 14/088,539

(22) Filed: Nov. 25, 2013

(65) Prior Publication Data
US 2015/0144201 A1 May 28, 2015

(51) Int. Cl.
*F02K 1/80* (2006.01)
*F02C 7/04* (2006.01)
*B64D 33/02* (2006.01)
*F16B 5/07* (2006.01)
*F16B 21/09* (2006.01)
*F02C 7/32* (2006.01)
*F16B 43/00* (2006.01)

(52) U.S. Cl.
CPC .............. *F02C 7/04* (2013.01); *B64D 33/02* (2013.01); *F02C 7/32* (2013.01); *F16B 5/07* (2013.01); *F16B 21/09* (2013.01); *F16B 43/009* (2013.01); *F05D 2220/329* (2013.01); *F05D 2230/60* (2013.01); *F05D 2260/30* (2013.01); *Y10T 29/49947* (2015.01); *Y10T 29/49948* (2015.01); *Y10T 137/0536* (2015.04)

(58) Field of Classification Search
CPC .......... F02K 1/80; F02K 1/805; F01D 25/243; Y10T 403/64; Y10T 403/645; Y10T 403/648
See application file for complete search history.

(56) References Cited

U.S. PATENT DOCUMENTS

| 100,036 A | 8/1911 | Barlow |
| 4,115,021 A | 9/1978 | Loch |
| 4,473,246 A | 9/1984 | McDowell |
| 5,026,096 A | 6/1991 | Lutz, II |

(Continued)

FOREIGN PATENT DOCUMENTS

| EP | 0333919 A1 | 9/1989 |
| FR | 2379720 A1 | 9/1978 |
| WO | 2007085347 A1 | 8/2007 |

OTHER PUBLICATIONS

EP Search Report, EP14194535; Issued Mar. 25, 2015; 5 pages.

*Primary Examiner* — Michael P Ferguson
(74) *Attorney, Agent, or Firm* — Cantor Colburn LLP

(57) ABSTRACT

A method of securing two components to each other includes locating a mounting strip at a first mounting flange of a first component. The mounting strip is slidably affixed to the first component and includes a plurality of strip openings and a tightening ramp located at each strip opening of the plurality of strip openings. A second component is located such that a second mounting flange of the second component abuts the first mounting flange. A plurality of fasteners are located at the second mounting flange. A fastener of the plurality of fasteners extends through each strip opening of the plurality of strip openings. The mounting strip is slid in a direction to increase tension on the plurality of fasteners via an increasing height of the tightening ramp under a fastener head of the fastener, thereby securing the first mounting flange to the second mounting flange.

14 Claims, 7 Drawing Sheets

(56) References Cited

U.S. PATENT DOCUMENTS

| | | | |
|---|---|---|---|
| 5,406,795 A | 4/1995 | Raub et al. | |
| 6,348,674 B1 * | 2/2002 | Russell | B23P 19/068 219/201 |
| 7,475,919 B2 | 1/2009 | Hiernard et al. | |
| 7,604,307 B2 | 10/2009 | Greenwald et al. | |
| 8,322,942 B2 * | 12/2012 | Howlett | F16B 5/0052 403/374.4 |
| 2011/0070078 A1 * | 3/2011 | Paprotna | F01D 11/005 415/214.1 |
| 2012/0219358 A1 | 8/2012 | Reed | |
| 2014/0035240 A1 * | 2/2014 | Sha | F01D 11/003 277/641 |
| 2015/0040393 A1 * | 2/2015 | Shteyman | B23P 15/00 29/888.02 |

\* cited by examiner

US 9,708,979 B2

ENGINE INLET DUCT INSTALLATION

BACKGROUND

The subject matter disclosed herein relates to engine inlets, more specifically, to installation of engine inlet ducts and/or cowling.

Engines for, for example, aircraft such as helicopters or other rotorcraft utilize engine inlet ducting to direct airflow into the compressor of the engine. Some systems, for example, single engine systems, utilize a bifurcated inlet duct, which takes two airflow streams and directs them to the compressor inlet. In such ducts, fastening of the two duct legs to each other is required both inside and outside of the duct to ensure a proper seal and prevent leakage into the duct.

Typically, the inside of the annulus is accessible, so that a traditional bolted flange joint between the two duct halves, can be tightened via traditional tools, such as wrenches, to install the inlet duct. In particular systems, however, a position of engine components, such as an engine shaft, prevents access via hands or traditional tools to the fastening locations necessary to provide the desired seal between the two duct halves.

BRIEF DESCRIPTION

In one embodiment, a method of securing two components to each other includes locating a mounting strip at a first mounting flange of a first component. The mounting strip is slidably affixed to the first component and includes a plurality of strip openings and a tightening ramp located at each strip opening of the plurality of strip openings. A second component is located such that a second mounting flange of the second component abuts the first mounting flange. A plurality of pre-set fasteners are located at the second mounting flange. A fastener of the plurality of fasteners extends through each strip opening of the plurality of strip openings. The mounting strip is slid in a direction to increase tension on the plurality of fasteners via an increasing height of the tightening ramp under a fastener head of the fastener, thereby securing the first mounting flange to the second mounting flange.

In another embodiment, an inlet duct assembly includes a first inlet duct leg. The first inlet duct leg includes a first mounting flange and a fastener extending from the first mounting flange. The fastener has a fastener head located at a selected distance from the mounting flange. A second duct leg includes a second mounting flange configured to abut the first mounting flange and a slidably located mounting strip having a strip opening. The fastener extends therethrough. The mounting strip includes a tightening ramp having an increasing height in one direction. Sliding the mounting strip along the second mounting flange increases a tension on the fastener and thus secures the first mounting flange to the second mounting flange.

In yet another embodiment, a method of installing an inlet duct assembly to a rotary winged aircraft includes locating a first inlet duct leg at an engine inlet of a rotary winged aircraft. The first inlet duct leg includes a first mounting flange and a fastener extending from the first mounting flange. The fastener has a fastener head disposed at a preselected distance from the mounting flange. A second inlet duct leg is located at the engine inlet such that a second mounting flange of the second inlet duct leg abuts the first mounting flange. The second inlet duct leg includes a slidably located mounting strip having a strip opening, the fastener extending therethrough, and a tightening ramp having an increasing height in one direction. The mounting strip is slid to increase tension on the fastener thereby securing the second mounting flange to the first mounting flange.

In still yet another embodiment, a method of installing an inlet duct assembly to a rotary winged aircraft includes locating a first inlet duct leg at an engine inlet of a rotary winged aircraft. The first inlet duct leg includes a first mounting flange and one or more fasteners extending from the first mounting flange. The fastener head(s) disposed at a preselected distance from the mounting flange. A second inlet duct leg is located at the engine inlet such that a second mounting flange of the second inlet duct leg abuts the first mounting flange. The second inlet duct leg includes a fixed mounting strip attached to the flange, having a strip opening, the fastener extending therethrough, and a tightening ramp having an increasing height in one direction. The insertion of the fastener of the first inlet leg into the lower ramp portion of the fixed mounting strip on the second inlet half, then, when the two inlet legs are moved relative to one another into final position, the fastener head is slid up the ramp to increase tension on the fastener thereby securing the second mounting flange to the first mounting flange.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
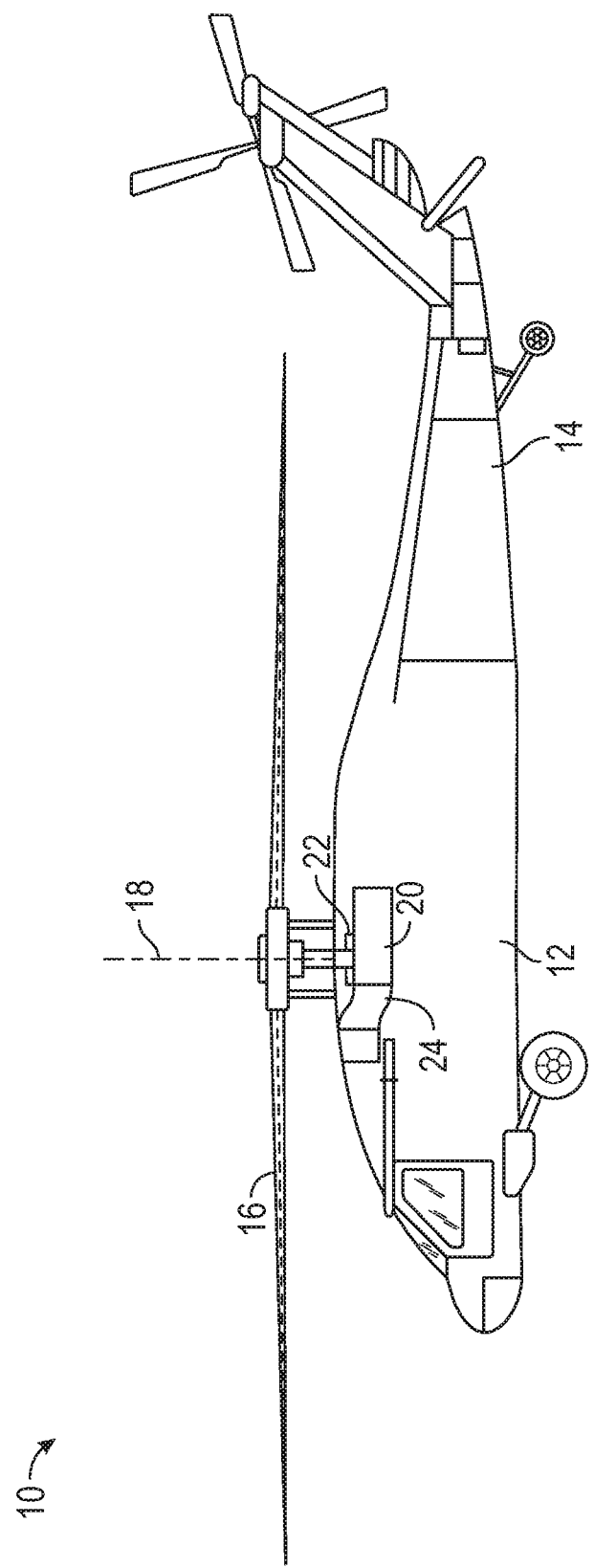
FIG. 1 is a illustration of an embodiment of a rotary winged aircraft.

Shown in FIG. 1 is a schematic view of an embodiment of a rotary wing aircraft, in this embodiment a helicopter 10. The helicopter 10 includes an airframe 12 with an extending tail 14. A rotor assembly 16 is located at the airframe 12 and rotates about a main rotor axis 18. The main rotor assembly 16 is driven by an engine 20 via a gearbox 22. To supply airflow to the engine 20, an air inlet duct 24 is provided to direct the airflow to an engine inlet 26 (FIG. 2).

Figure 2:
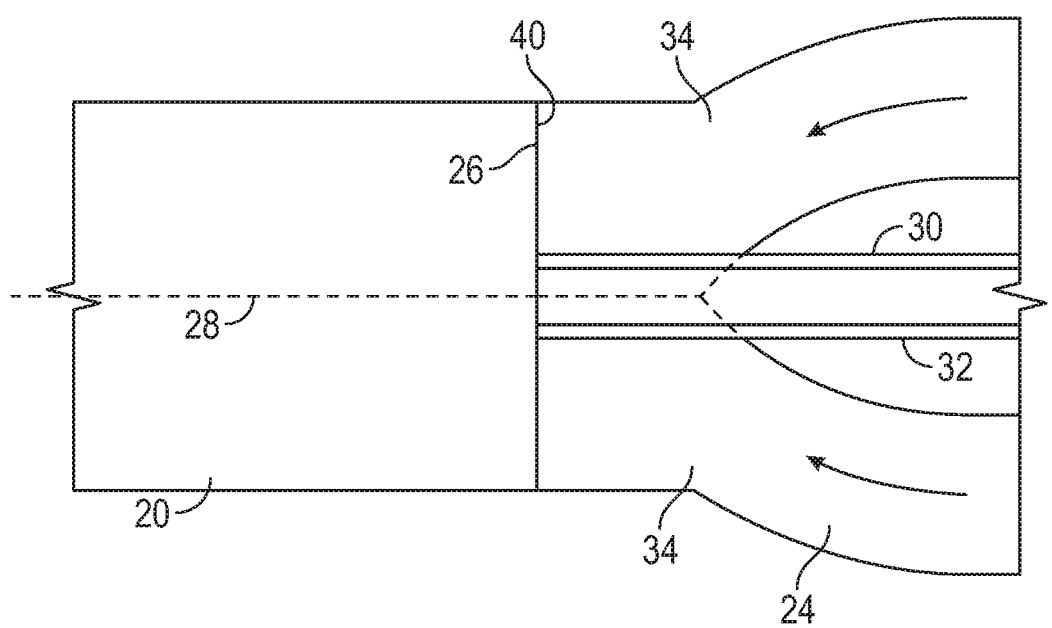
FIG. 2 is a schematic view of an embodiment of an engine inlet layout.
Figure 3:
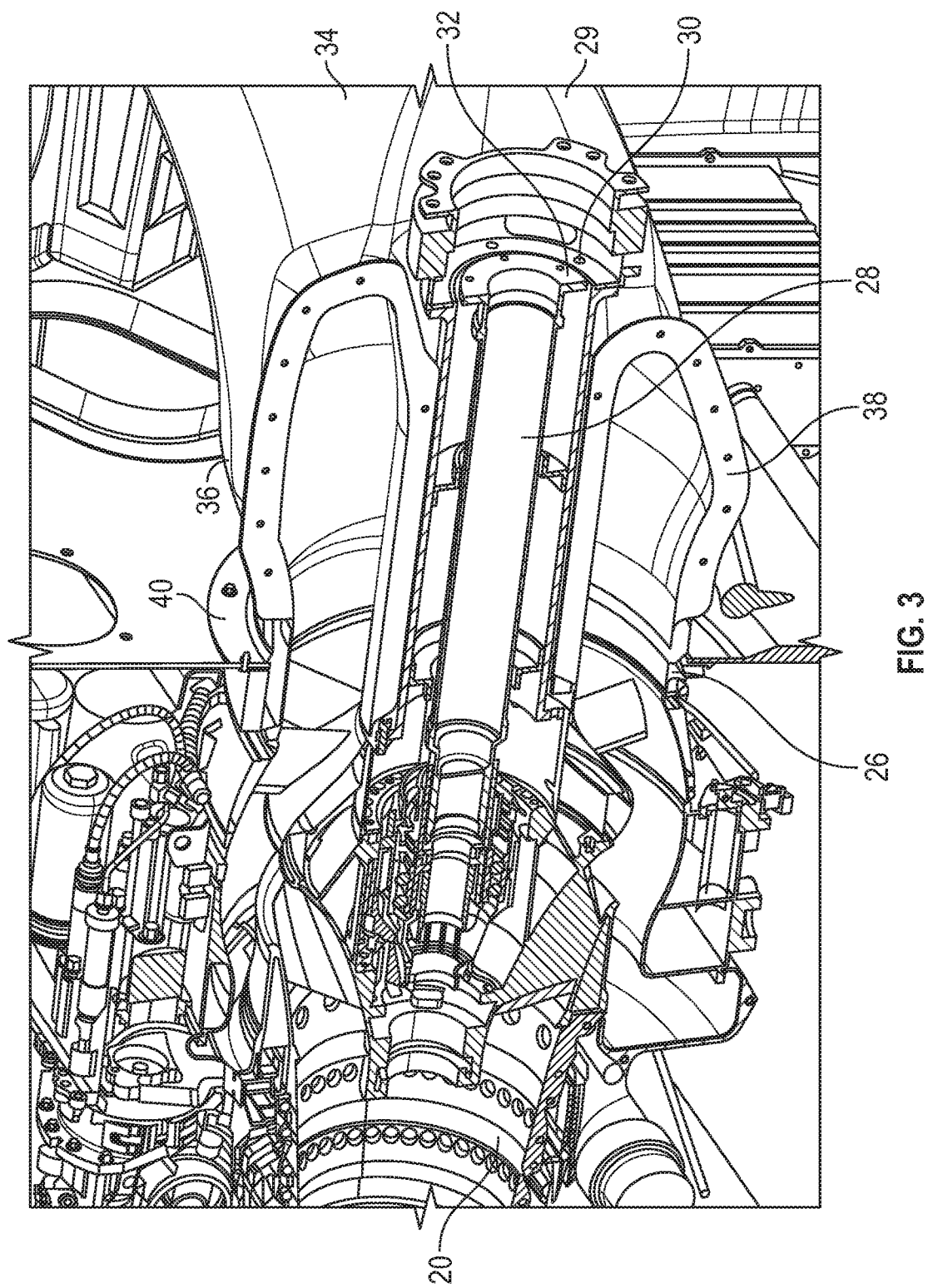
FIG. 3 is a cross-sectional view of an embodiment of an engine inlet layout.

Referring to FIG. 2, the engine 20 rotates about an engine axis 28, with an engine shaft 30 and a mount shaft 32 located at the engine axis 28 to support the engine 20. The air inlet duct 24 is bifurcated, with duct legs 34 extending from the engine inlet 26 along each lateral side of the engine axis 28, around the mount shaft 32. As shown in FIG. 3, each duct leg 34 has an upper lobe 36 and a lower lobe 38 extending to the engine axis 28, where the upper lobes 36 of the duct legs 34 are joined together, and similarly the lower lobes 38 of the duct legs 34 are joined together. Even though, in the embodiment shown, the lobes 36/38 are upper and lower lobes 36/38 and the duct legs 34 are arranged on lateral sides of the engine axis 28, it is to be appreciated that other arrangements of duct legs 34, for example, extending from upper and lower sides of the engine axis 28, may be utilized. Similarly, the duct lobes 36/38, may be arranged on lateral sides of the engine axis 28. The air inlet duct 24 may also be secured to an axial location, such as a forward bulkhead 40.

Due to the location of the mount shaft 32 and the shape of the inlet duct 24, typical methods used to secure the duct legs 34 to each other are unable to be used, as the area between the duct legs 34, as well as an interior of the inlet duct 24 is inaccessible with conventional tools.

Figure 4:
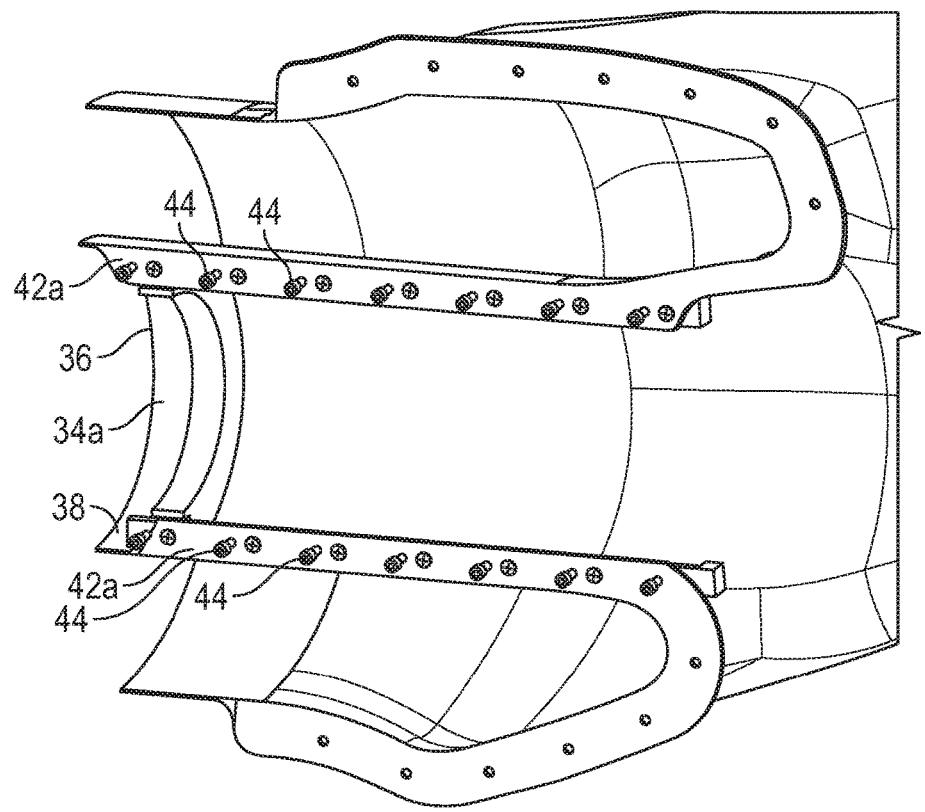
FIG. 4 is a schematic view of an embodiment of an inlet duct half.
Figure 5:
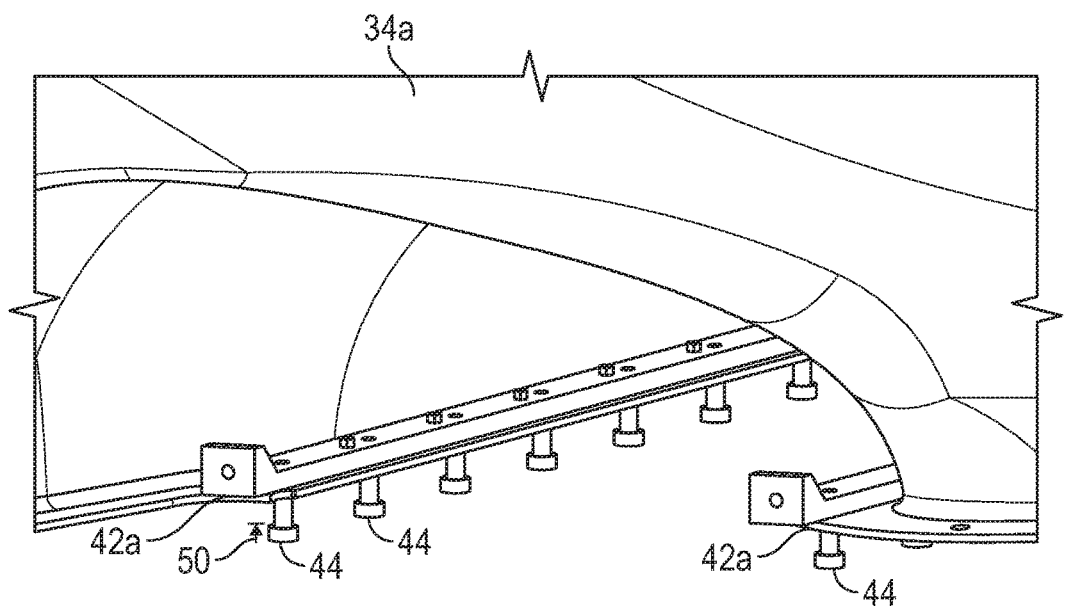
FIG. 5 is an axial view of an embodiment of fan inlet duct half.

Referring now to the schematic view of FIG. 4, to fasten the duct legs 34 to one another, each duct leg 34 is formed with a mounting flange 42 extending along an axial length of the duct leg 34. A first duct leg 34a includes a first mounting flange 42a at both the upper lobe 36 and lower lobe 38 of the first duct leg 34a. The first mounting flange 42a includes a plurality of fasteners 44 extending therefrom toward a second mounting flange 42b of a second duct leg 34b (shown in FIG. 6). The fasteners 44, for example, bolts, screws, pins or the like have a shaft 46 and a head 48, with the head 48 located at a selected head height 50, as shown in FIG. 5.

Figure 6:
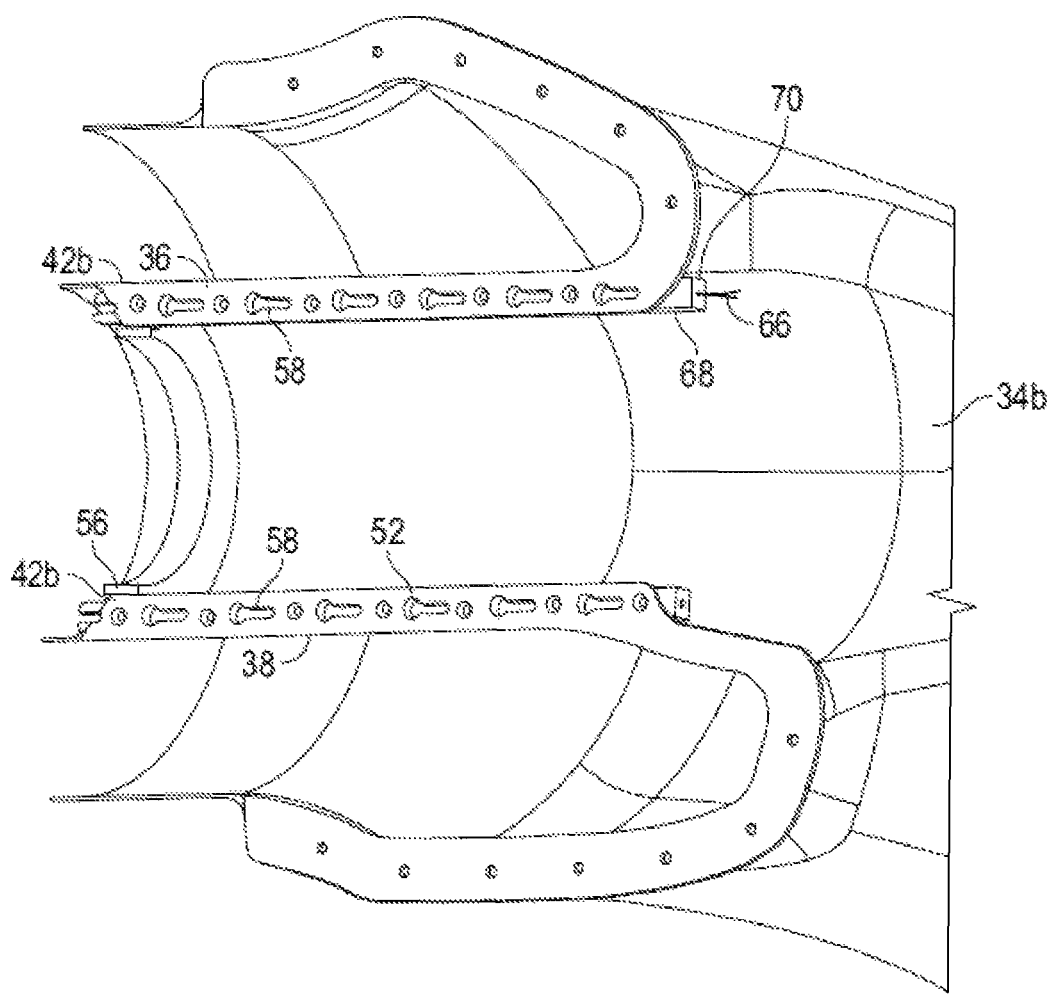
FIG. 6 is a schematic view of an embodiment of another inlet duct half.
Figure 7:
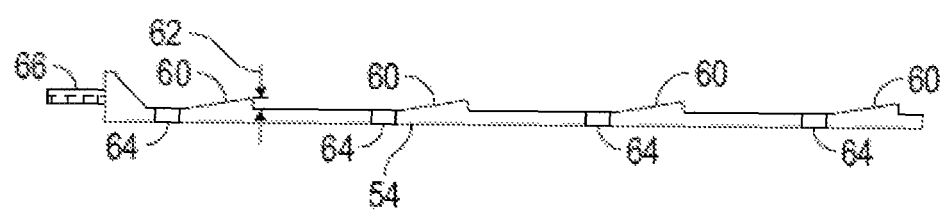
FIG. 7 is a profile view of a mounting plate for an inlet duct.

Referring now to FIG. 6, the second mounting flange 42b is located at both the upper lobe 36 and lower lobe 38 of the second duct leg 34b and includes a plurality of fastener openings 52 through which the fasteners 44 extend, and a mounting strip 54 located at an interior side 56 of the second mounting flange 42b. The mounting strip 54 is slidable on the second mounting flange 42b in an axial direction. In some embodiments, the mounting strip 54 is formed from a metal material. The mounting strip 54 has a plurality of strip openings 58, which in some embodiments are keyhole shaped. Further, referring now to FIG. 7, a tightening ramp 60 is located at each strip opening 58. Each tightening ramp 60 increases in ramp height 62 with distance from a circular portion 64 of the strip opening 58. Further, the mounting strip 54 includes a tightening bolt 66 located at an axial end of the mounting strip 54 and extending in an axial direction into, referring again to FIG. 6, a mounting stop 68 of the second mounting flange 52b, which includes a rotatable tightening nut. 70.

Figure 8:
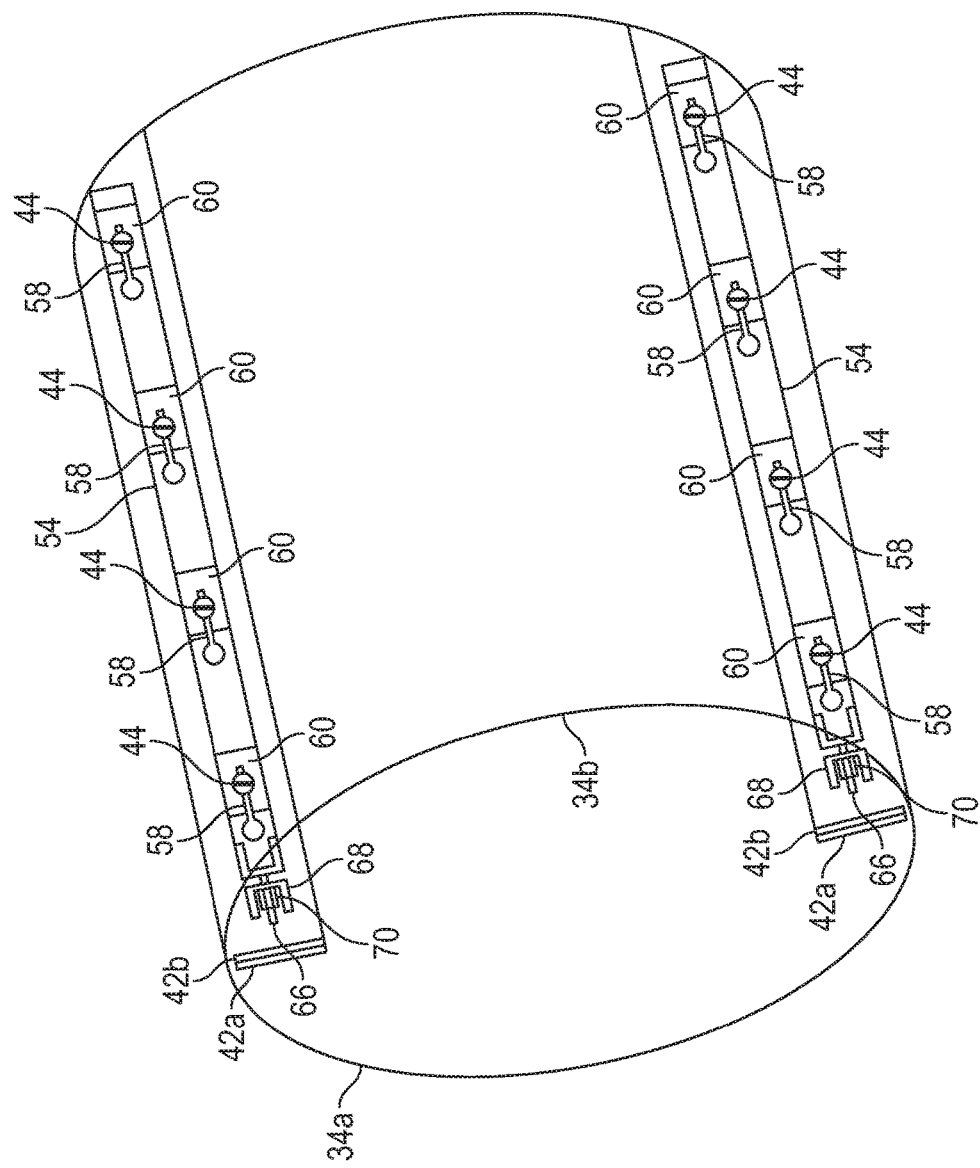
FIG. 8 is a schematic view of an embodiment of an assembled inlet duct.

Referring now to FIG. 8, to install the inlet duct 24 to the airframe 12, the first duct leg 34a including the fasteners 44 at the first mounting flange 42a is installed to the airframe 12 and secured in place at, for example, the forward bulkhead 40. Next, the second duct leg 34b is installed to the airframe 12 and secured at, for example, the forward bulkhead 40 so that the heads 48 of the fasteners 44 extend through circular portions 64 of the strip openings 58. The tightening nut 70 is then rotated, tightening the tightening nut 70 onto the tightening bolt 66, which has the effect of drawing the mounting strip 54 axially toward the mounting stop 68. This axial movement of the mounting strip 54 increases a height of the tightening ramps 60 under the fastener heads 48. This, in turn, increases a tension on the fasteners 44 drawing the second mounting flange 42b toward the first mounting flange 42a and sealing therebetween.

Figure 9:
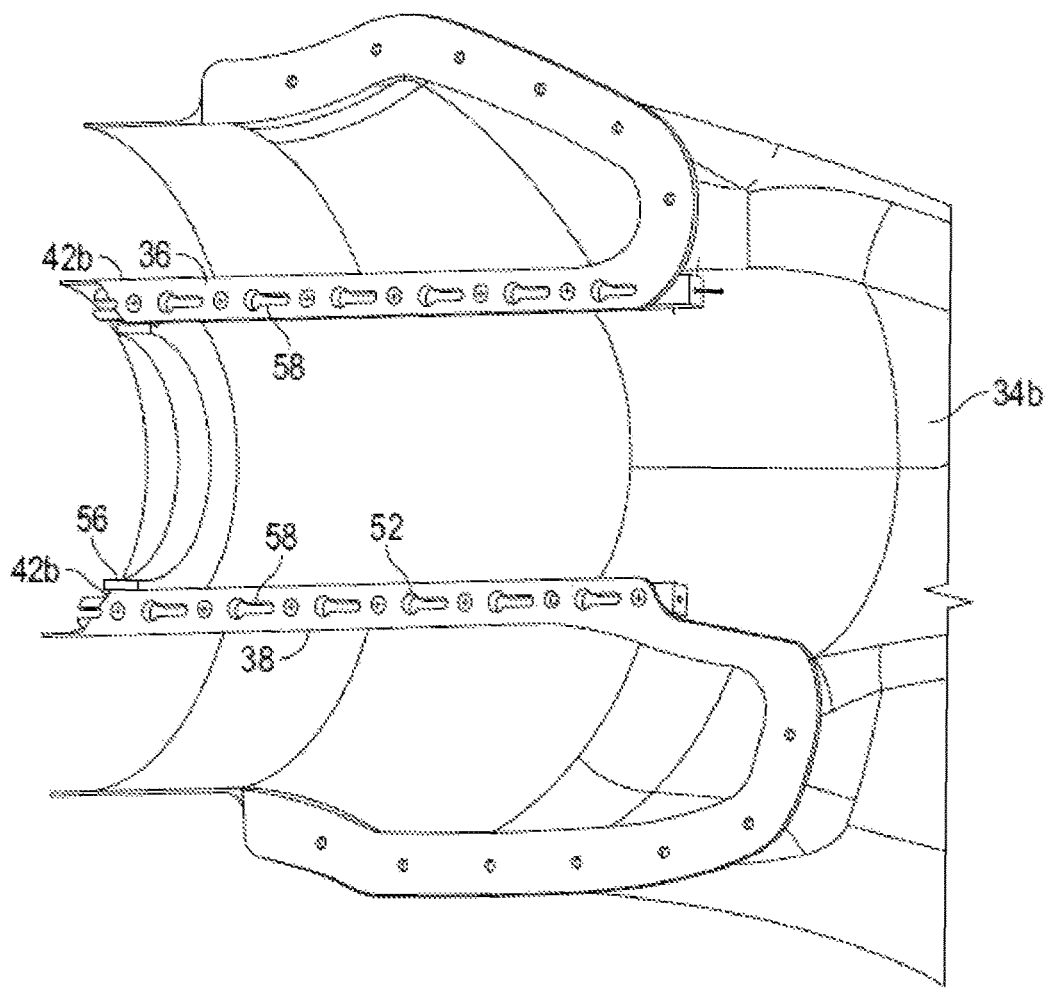
FIG. 9 is a schematic view of an alternate embodiment of another inlet duct half.

In an alternate embodiment, as illustrated in FIG. 9, the mounting strip 54 is affixed to the flange of the second mounting flange 42b, and when the fastener heads 48 are inserted into the strip openings 58, the flanges of the two inlet halves can be moved relative to one another axially in which the height of the tightening ramps 60 under the fastener heads increase, in turn increasing the tension on the fasteners 44 drawing the second mounting flange 42b toward the first mounting flange 42a as in the above.

The structure and method described herein provides for remote fastening between two components via the sliding mounting strip 54 relative to fasteners 44 through the use of the axially directed tightening bolt 66 to cause movement of the mounting strip 54. While described herein relative to engine inlet ducts, it is to be appreciated that the structure and method described would be useful in other applications, such as fastening components of cowlings or fairings to one another.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An inlet duct assembly comprising an inlet duct having a bifurcated configuration along a longitudinal axis thereof and comprising:
    a first inlet duct leg comprising a pair of first flanges extending along opposing longitudinal edges thereof, each first flange including:
    a first mounting flange; and
    a plurality of fasteners extending from the first mounting flange, each fastener having a fastener head disposed at a preselected distance from the mounting flange;
    a second inlet duct leg comprising a pair of second flanges extending along opposing longitudinal edges thereof, each second flange including:
    a second mounting flange configured to abut a respective one of the first mounting flanges and comprising a plurality of fastener openings receiving the fasteners therethrough; and
    a mounting strip moveably located on the second mounting flange having:
    a plurality of strip openings, a respective one of the fasteners extending therethrough each strip opening; and
    a tightening ramp corresponding to each strip opening having an increasing height in one direction;
    the first and second inlet duct legs configured to extend along lateral sides of an engine axis and around a mount shaft located at the engine axis:
    wherein movement between the mounting strips and the fastener heads in an axial direction of the mounting strips increases a tension on the fasteners and thus secures the first mounting flanges to the second mounting flanges.

2. The inlet duct assembly of claim 1, wherein each mounting strip is slidably located on the respective second mounting flange, the inlet duct assembly further comprising:
   a tightening bolt extending from one end of each mounting strip;
   a stop disposed at each second mounting flange; and
   a tightening nut disposed at each stop, such that tightening the tightening nut over the tightening bolt urges sliding of the mounting strip toward the stop.

3. The inlet duct assembly of claim 2, wherein each tightening ramp has increasing height with distance from the stop.

4. The inlet duct assembly of claim 1, wherein each mounting strip is slidably located on the respective second mounting flange and sliding the mounting strip increases a height of tightening of the tightening ramps between the fastener heads and the second mounting flange.

5. The inlet duct assembly of claim 1, wherein each fastener is one of a bolt, screw or pin.

6. The inlet duct assembly of claim 1, wherein the first inlet duct leg and/or the second duct leg are secured to an airframe.

7. The inlet duct assembly of claim 1, wherein each strip opening has a keyhole shape.

8. The inlet duct assembly of claim 1, wherein each fastener head is slidable along the corresponding ramp.

9. A method of installing an inlet duct assembly comprising an inlet duct having a bifurcated configuration along a longitudinal axis thereof to a rotary winged aircraft comprising:
   locating a first inlet duct leg at an engine inlet of a rotary winged aircraft, the first inlet duct leg comprising a pair of first flanges extending along opposing longitudinal edges thereof, each first flange including:
   a first mounting flange; and
   a plurality of fasteners extending from the first mounting flange, each fastener having a fastener head disposed at a preselected distance from the mounting flange;
   locating a second inlet duct leg at the engine inlet, the second inlet duct leg comprising a pair of second flanges extending along opposing longitudinal edges thereof, each second flange including a second mounting flange which abuts a respective one of the first mounting flanges and comprises a plurality of fastener openings receiving the fasteners therethrough, each second flange including a mounting strip moveably located on the second mounting flange having:
   a plurality of strip openings, a respective one of the fasteners extending therethrough each strip opening; and
   a tightening ramp corresponding to each strip opening having an increasing height in one direction; and
   moving the mounting strips and the fastener heads relative to each other in an axial direction of the mounting strips to increase tension on the fasteners thereby securing the second mounting flanges to the first mounting flanges;
   wherein the first and second inlet duct legs extend along lateral sides of an engine axis and around a mount shaft located at the engine axis.

10. The method of claim 9, wherein each mounting strip is slidable on the respective second mounting flange, and moving the mounting strip and the fastener heads relative to each other in the axial direction of the mounting strip includes sliding the mounting strip and comprises:
    extending a tightening bolt of the mounting bracket strip through a stop; and
    tightening a nut disposed at the stop over the bolt to urge the mounting bracket strip toward the stop.

11. The method of claim 9, wherein moving each mounting strip and the fastener heads relative to each other increases a tightening ramp height between each fastener head and the respective second mounting flange to increase the tension on the fasteners.

12. The method of claim 9, wherein each fastener is one of a bolt, screw or pin.

13. The method of claim 9, wherein the first inlet duct leg and/or the second inlet duct leg are secured to an airframe.

14. The method of claim 9, wherein each strip opening has a keyhole shape.

* * * * *